United States Patent [19]
Matsubara

[11] Patent Number: 6,023,603
[45] Date of Patent: Feb. 8, 2000

[54] SATELLITE SIGNAL SPLITTER

[75] Inventor: Hiroshi Matsubara, Owariasahi, Japan

[73] Assignee: Masprodenkoh Kabushikikaisha, Nisshin, Japan

[21] Appl. No.: 08/962,935

[22] Filed: Oct. 28, 1997

[30] Foreign Application Priority Data

Nov. 1, 1996 [JP] Japan ................................ 8-291726

[51] Int. Cl.[7] .................................................. H04N 7/00
[52] U.S. Cl. ...................... 455/3.2; 455/132; 455/188.1; 348/10
[58] Field of Search .................................. 455/3.2, 12.1, 455/131, 132, 188.1, 188.2, 189.1; 348/6, 8, 10

[56] References Cited

U.S. PATENT DOCUMENTS

| | | | |
|---|---|---|---|
| 4,527,136 | 7/1985 | Kamiya | 455/3.2 |
| 4,672,687 | 6/1987 | Horton et al. | 455/3.2 |
| 4,675,732 | 6/1987 | Oleson | 455/12.1 |
| 5,787,335 | 7/1998 | Novak | 455/3.2 |
| 5,805,975 | 9/1998 | Green, Sr. et al. | 455/12.1 |

*Primary Examiner*—Paul Loomis
*Attorney, Agent, or Firm*—Davis and Bujold

[57] ABSTRACT

A satellite signal splitter is proposed which can transmit a received signal of a desired polarized wave with one cable to each terminal side when transmitting to plural terminal sides the received signals from a satellite receiving antenna which emits the received signals of a vertically polarized wave and a horizontally polarized wave.

The vertically and horizontally polarized-wave received signals transmitted to input terminals 22V and 22H are split into four by splitting circuits 26V and 26H, respectively. The four split signals are transmitted to switching circuits 28a to 28d. In the switching circuits 28a to 28d, in accordance with a voltage level (11V or 15V) of a polarized-wave switching signal transmitted from terminal units connected to output terminals 24a to 24d, either the vertically or horizontally polarized-wave signal is selected and emitted from the output terminals 24a to 24d. Also, the polarized-wave switching signal (11V or 15V) is transmitted via a voltage synthesizing portion 30, choke coils LV, LH and the like from the input terminals 22V and 22H to a corresponding receiving portion of a receiving antenna.

9 Claims, 6 Drawing Sheets

SATELLITE SIGNAL SPLITTER

DETAILED DESCRIPTION OF THE INVENTION

[0001]

1. Technical Field of the Invention

The present invention relates to a preferable satellite signal splitter which splits received signals transmitted from a satellite receiving antenna, which is for receiving electric waves of two orthogonal polarized waves transmitted from a communication satellite and emitting received signals of the polarized waves, to plural terminal units.

[0002]

2. Prior Art and Problem to be Solved by the Invention

As a satellite receiving antenna for receiving two orthogonal polarized waves from a communication satellite, a heretofore known antenna is provided with a receiving portion for splitting electric waves of two orthogonal polarized waves into a vertically polarized-wave signal and a horizontally polarized-wave signal, converting the vertically polarized-wave signal and the horizontally polarized-wave signal into received signals having a predetermined frequency band, respectively, and emitting the converted received signals.

[0003]

To transmit the received signals from the satellite receiving antenna to the terminal side, two cables for emitting the received signals are connected to a pair of output terminals for emitting the polarized-wave signals of the receiving portion, respectively, and extended to a terminal side. Also, to use the received signals from one antenna at plural terminal units, the two cables extended from the antenna are provided halfway with splitters, respectively. The vertically polarized-wave signal and the horizontally polarized-wave signal split by the splitters are transmitted via the cables to the terminal units, respectively.

[0004]

For this reason, to use a satellite signal received through this type of satellite receiving antenna, two cables are heretofore required for vertically and horizontally polarized waves, respectively. Also, two terminals for taking the received signal must be provided in each room on a terminal side. Therefore, indoor wiring works are remarkably laborious.

[0005]

Further, in a tuner (so-called CS tuner) provided on the terminal side, when receiving the vertically polarized-wave signal, a direct-current voltage signal (generally of 11V) for receiving vertically polarized waves is usually transmitted to the antenna from an input terminal to which the received signal is transmitted via the cable from the antenna. When receiving the horizontally polarized-wave signal, a direct-current voltage signal (generally of 15V) for receiving horizontally polarized waves is transmitted from the input terminal to the antenna. It is impossible to transmit the received signals of the polarized waves as they are to the CS tuner so that the tuner selects either of the received signals. Therefore, there is a problem that a switching unit must be separately provided on the terminal side for receiving the polarized-wave switching signal (of 11V or 15V) from the CS tuner and switching between the input of the vertically polarized-wave signal and the input of the horizontally polarized-wave signal into the CS tuner.

[0006]

In view of the above problem, the present invention has been developed. An object of the invention is to provide a satellite signal splitter in which when transmitting to plural terminals signals received from a satellite receiving antenna which emits a vertically polarized-wave signal and a horizontally polarized-wave signal, respectively, the received signals of a desired polarized wave can be transmitted via one cable to each terminal without laying two cables in a received signal transmission system for transmitting the received signals.

[0007]

To attain this object, the invention as claimed in claim 1 provides a satellite signal splitter which is connected to a satellite receiving antenna provided with a receiving portion for receiving an electric wave of two orthogonal polarized waves transmitted from a communication satellite by splitting the electric wave into a vertically polarized wave and a horizontally polarized wave, converting polarized-wave signals to received signals having a predetermined frequency band and emitting the converted signals, splits the received signals from the receiving portion into plural signals and which transmits the split signals to a terminal side.

The satellite signal splitter is provided with a pair of input terminals for receiving the vertically polarized-wave signal and the horizontally polarized-wave signal from the receiving portion, respectively, a pair of splitting circuits for splitting the polarized-wave signals transmitted to the pair of input terminals into plural signals, respectively, plural switching circuits corresponding to the number of signals split by the pair of splitting circuits for receiving the vertically polarized-wave signal and the horizontally polarized-wave signal split by the splitting circuits and selecting either one of the signals to be emitted, and plural output terminals corresponding to the number of split signals for transmitting the vertically polarized-wave signal and the horizontally polarized-wave signal transmitted from the switching circuits to the terminal units, respectively. The switching circuits select either one of the vertically polarized-wave signal and the horizontally polarized-wave signal in accordance with a polarized-wave switching signal transmitted to the output terminal connected thereto from the terminal side and emit the selected signal to the output terminals.

[0008]

In the satellite signal splitter of the invention constituted as aforementioned, when the vertically polarized-wave signal and the horizontally polarized-wave signal emitted from the receiving portion of the satellite receiving antenna are transmitted to corresponding input terminals, the vertically polarized-wave signal and the horizontally polarized-wave signal are split into plural signals by the splitting circuits connected to the input terminals. The plural split vertically and horizontally polarized-wave signals are transmitted to the plural switching circuits, respectively, by each set of the vertically polarized-wave signal and the horizontally polarized-wave signal.

[0009]

On the other hand, each switching circuit is connected to the output terminal for transmitting to the terminal side either selected one of the received vertically and horizontally polarized-wave signals. Each switching circuits selects either one of the vertically and horizontally polarized-wave signals in accordance with the polarized-wave switching signal transmitted from the terminal side to the output terminal connected thereto and emits the selected signal to the output terminal.

[0010]

As a result, according to the satellite signal splitter of the invention, by transmitting the polarized-wave switching signal to plural output terminals from terminal units (the aforementioned CS tuner or the like) connected to the terminals, each output terminal emits the received signal of the vertically polarized wave or the horizontally polarized wave selected in accordance with the polarized-wave switching signal. On the side of each terminal unit, we can enjoy the broadcasting of a desired polarized channel.
[0011]

According to the invention, since the transmission path of the received signals extended from the satellite signal splitter to the terminal units can be constituted of one cable, the wiring work of the received signal transmitting cable can be more easily performed than the prior art. Different form the prior art, no switching unit for switching between the vertically polarized wave and the horizontally polarized wave is separately provided in the received signal input path to the terminal units. Further, since one input terminal of the received signal is sufficient in each room where the terminal unit is installed, the installation work of the terminal unit in each room can be easily performed. Additionally, the number of components installed in each room can be reduced.
[0012]

Subsequently, according to the invention as claimed in claim 2, in the satellite signal splitter according to claim 1, the switching circuit is provided with a determination circuit for determining which one of the vertically polarized-wave signal and the horizontally polarized-wave signal is to be emitted in accordance with a voltage level of the polarized-wave switching signal transmitted to the output terminal from the terminal side, and a drive circuit for driving a switch in accordance with a result of determination made by the determination circuit to transmit either one of the vertically polarized-wave signal and the horizontally polarized-wave signal to the output terminal.
[0013]

Specifically, in the satellite signal splitter as claimed in claim 1, for example, when the switching circuit is constituted to select the polarized-wave signal in accordance with the duty ratio of the polarized-wave switching signal, then, as the polarized-wave switching signal transmitted from the terminal side to the output terminal, a duty signal whose duty ratio is set different from when receiving the vertically polarized wave to when receiving the horizontally polarized wave can be used. When the switching circuit is constituted to select the polarized-wave signal in accordance with the frequency of the polarized-wave switching signal, then, as the polarized-wave switching signal transmitted from the terminal side to the output terminal, a alternating-current signal whose frequency is set different from when receiving the vertically polarized wave to when receiving the horizontally polarized wave can be used. However, the CS tuner or the like usually emits a direct-current voltage whose voltage level is set at 11V or 15V as the polarized-wave switching signal. In accordance with the voltage level, switching is made between the vertically polarized wave and the horizontally polarized wave. Therefore, when the switching circuit is constituted to select either one of the vertically polarized-wave signal and the horizontally polarized-wave signal by checking the duty ratio or the frequency of the polarized-wave switching signal, an exclusive unit which can emit the polarized-wave switching signal with its duty ratio or frequency controlled must be provided on the terminal side.
[0014]

Therefore, in the switching circuit of the satellite signal splitter as claimed in claim 2, first the determination circuit determines in accordance with the voltage level of the polarized-wave switching signal transmitted to the output terminal from the terminal side which one of the vertically polarized-wave signal and the horizontally polarized-wave signal is to be emitted. Thereafter, the drive circuit drives the switch in accordance with the determination result to select the polarized-wave signal to be transmitted as the received signal to the output terminal. As a result, according to the invention, the polarized-wave switching signal (direct-current voltage) emitted from the CS tuner or the like can be transmitted to the output terminal as it is. The satellite signal splitter can be used in a general common receiving system.
[0015]

Subsequently, according to the invention as claimed in claim 3, in the satellite signal splitter according to claim 1 or claim 2, to supply a power to the receiving portion, a power circuit is provided for transmitting from the input terminals to the receiving portion a direct-current voltage which is obtained by rectifying and smoothing a commercial power.
[0016]

Specifically, the receiving portion of the satellite receiving antenna is operated when the power is supplied from the terminal side to the output terminals which usually emit the received signals. Here, in the satellite signal splitter as claimed in claim 3, the power circuit is provided for generating the direct-current voltage by rectifying and smoothing the commercial power. The direct-current voltage generated by the power circuit is transmitted from the input terminals to the receiving portion of the satellite receiving antenna. Thereby, the power is supplied to the receiving portion. As a result, according to the invention, when constituting the common receiving system, a separate power unit for supplying the power to the satellite receiving antenna is unnecessary. The common receiving system can be easily constituted.
[0017]

On the other hand, according to the invention as claimed in claim 4, in the satellite signal splitter according to claim 2, a direct-current signal bypass circuit is provided for letting the polarized-wave switching signal transmitted to the output terminals from the terminal side as a power supply signal to the receiving portion of the satellite receiving antenna to bypass the input terminals.
[0018]

Specifically, in the invention, to supply the power to the receiving portion of the satellite receiving antenna, by using the direct-current signal bypass circuit, the polarized-wave switching signal (direct-current voltage) from the terminal side connected to the output terminals bypasses the input terminals as it is. Thereby, the polarized-wave switching signal constituted of the direct-current voltage supplied from the terminal side is transmitted from the input terminals to the receiving portion as the power supply signal to the receiving portion.
[0019]

As a result, like in the usual CS tuner, when the polarized-wave switching signal (direct-current voltage) serving also as the power supply to the satellite receiving antenna is transmitted from the terminal unit to the satellite signal splitter, the power can be supplied to the receiving portion of the satellite receiving antenna in accordance with the polarized-wave switching signal. Also, in this case, to supply the power to the receiving portion, no power circuit is necessary in the splitter. Therefore, as compared with the splitter as claimed in claim 3, the constitution can be made simple.
[0020]

Subsequently, according to the invention as claimed in claim 5, in the satellite signal splitter according to claim 4, the direct-current signal bypass circuit is provided with polarized-wave switching signal output circuits disposed in the switching circuits, respectively, for transmitting the polarized-wave switching signal via the switch to an input path of the vertically polarized-wave signal or the horizontally polarized-wave signal; a voltage synthesizing portion for synthesizing the polarized-wave switching signal transmitted via the polarized-wave switching signal output circuits and the switch to the input path of the vertically polarized-wave signal of the switching signal circuits and the polarized-wave switching signal transmitted via the polarized-wave switching signal output circuits and the switch to the input path of the horizontally polarized-wave signal of the switching signal circuits, respectively; and a synthesized voltage applying circuit for applying to the input terminal of the vertically polarized-wave signal a synthesized voltage of the polarized-wave switching signal transmitted to the input path of the vertically polarized-wave signal and synthesized by the voltage synthesizing portion and applying to the input terminal of the horizontally polarized-wave signal a synthesized voltage of the polarized-wave switching signal transmitted to the input path of the horizontally polarized-wave signal and synthesized by the voltage synthesizing portion.

[0021]

Specifically, the receiving portion of the satellite receiving antenna is provided with a converter circuit which is operated in response to the polarized-wave switching signal and emits the vertically polarized-wave signal when the voltage level of the polarized-wave switching signal emitted from the CS tuner or the like equals the voltage level for receiving the vertically polarized wave (usually, direct current 11V). Another circuit is operated in response to the polarized-wave switching signal and emits the horizontally polarized-wave signal when the voltage level of the polarized-wave switching signal equals the voltage level for receiving the horizontally polarized wave (usually, direct current 15V). The known receiving portion is provided with these two converter circuits.

[0022]

The satellite receiving antenna having the aforementioned receiving portion needs to transmit the polarized-wave switching signal for receiving the vertically polarized wave to the converter circuit for emitting the vertically polarized-wave signal and transmit the polarized-wave switching signal for receiving the horizontally polarized wave to the converter circuit for emitting the horizontally polarized-wave signal, respectively.

[0023]

In the invention (claim 5), to supply the power to the receiving portion provided with the two converter circuits in accordance with the polarized-wave switching signal transmitted from the terminal side to the output terminals, first the polarized-wave switching signal output circuits disposed in the respective switching circuits transmit the polarized-wave switching signal to the input path of the received signal (the vertically polarized-wave signal or the horizontally polarized-wave signal) corresponding to the signal level. The voltage synthesizing portion disposed in the input path of each received signal (that is to say, a splitting path of the received signal from each splitting circuit) synthesizes the polarized-wave switching signal for receiving the vertically polarized wave and the polarized-wave switching signal for receiving the horizontally polarized wave transmitted to the output terminals, respectively. Subsequently, when the synthesized voltage applying circuit applies the synthesized voltage of the polarized-wave switching signal for receiving each polarized wave to the input terminal for receiving the corresponding polarized wave, a voltage necessary for operation is supplied from each input terminal to the output terminal of the receiving portion (i.e., each converter circuit as aforementioned). Additionally, the synthesized voltage of the polarized-wave switching signal synthesized by the voltage synthesizing portion is an average voltage of the polarized-wave switching signal. However, the polarized-wave switching signal to be synthesized is either for receiving the vertically polarized wave or for receiving the horizontally polarized wave. Therefore, the synthesized voltage is a set voltage (usually of 11V or 15V) of the polarized-wave switching signal for receiving the vertically or horizontally polarized wave.

[0024]

As a result, according to the invention (claim 5), in the direct-current signal bypass circuit constituted of the polarized-wave switching signal output circuit, the voltage synthesizing portion and the synthesized voltage applying circuit, the polarized-wave switching signal emitted from the terminal unit is synthesized. Thereby, the voltage necessary for each output terminal (i.e., each converter circuit) of the receiving portion can be supplied. The receiving portion of the satellite receiving antenna can be operated normally.

[0025]

Subsequently, according to the invention as claimed in claim 6, the satellite signal splitter according to either one of claims 1 to 5 is further provided with a second input terminal for receiving a second received signal from a second receiving antenna other than the satellite receiving antenna; a second splitting circuit for splitting into two the received signal transmitted to the second input terminal; and a second received signal superimposing circuit for superimposing the second received signals split into two by the second splitting circuit to received signal input paths of the pair of splitting circuits and transmitting to the pair of splitting circuits the second received signals together with the vertically polarized-wave signal and the horizontally polarized-wave signal, respectively.

[0026]

As a result, in the satellite signal splitter of the invention (claim 6), the second received signal is received by the second receiving antenna different from the satellite receiving antenna, such as a receiving antenna (VHF antenna or UHF antenna) for receiving, for example, a VHF or UHF television broadcasting signal, a receiving antenna (BS antenna) for receiving a television broadcasting signal from a broadcasting satellite and the like. By transmitting the second received signal to the second input terminal, the second received signal, together with the vertically and horizontally polarized-wave signals received by the satellite receiving antenna, is transmitted to the pair of splitting circuits, respectively. Each output terminal emits the second received signal and the vertically or horizontally polarized-wave signal in accordance with the polarized-wave switching signal transmitted from the terminal unit.

[0027]

Consequently, according to the invention, the satellite signal splitter can transmit to each terminal unit the television broadcasting signal or another second received signal received by the second receiving antenna and the received signal (vertically polarized-wave signal or horizontally polarized-wave signal) received by the satellite receiving antenna from the communication satellite by using one cable. The cable wiring work or the like can be facilitated.

[0028]

Further, in operation, simply by replacing the present installed splitter in the common receiving system for receiving television broadcasting with the satellite signal splitter of the invention, the common receiving system can be changed for the purpose of so-called CS receiving, so that the signal received from the communication satellite can be split to signals to be transmitted to the terminal units.

[0029]

MODE FOR CARRYING OUT THE INVENTION

An embodiment of the invention is described with reference to the accompanying drawings.

Figure 2:
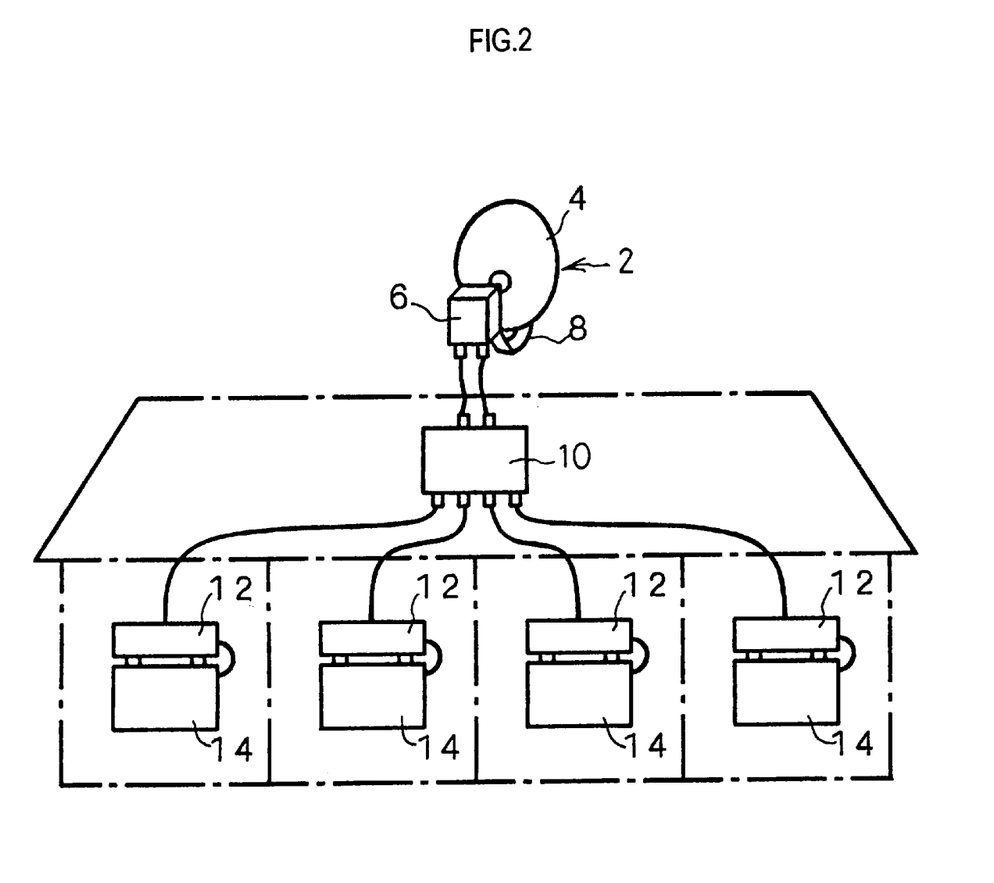
[FIG. 2] It is a schematic diagram showing a constitution of an entire common receiving system according to the embodiment.

First, FIG. 2 is a block diagram showing an entire constitution of a common receiving system provided with a satellite signal splitter (hereinafter, referred to just as the splitter) to which the invention is applied.

[0030]

As shown in FIG. 2, the common receiving system of the embodiment is provided with a receiving antenna 2 which is an off-set type of parabola antenna for receiving two orthogonal polarized waves transmitted from a communication satellite. The receiving antenna 2 is constituted of a reflective mirror 4 and a receiving portion 6 disposed on a focal position of the reflective mirror 4 via a support arm 8. The receiving portion 6, called a two-output type of converter, is provided in a known manner with a pair of converter circuits which receive and amplify the electric waves transmitted from the communication satellite and collected on the reflective mirror 4, independently select a polarized wave and convert the wave to a received signal having a predetermined frequency band (950 to 1500 MHz).

[0031]

Also in the receiving portion 6, two systems independently select the vertically polarized wave or the horizontally polarized wave in accordance with a value of voltage applied to output terminals. The output terminals are connected to a pair of input terminals 22V and 22H (see FIG. 1) of a splitter 10 via coaxial cables for transmitting the received signal. Additionally, characters V and H affixed to the input terminals 22 represent the vertically polarized wave and the horizontally polarized wave, respectively.

[0032]

Subsequently, the splitter 10 splits a vertically polarized-wave signal and a horizontally polarized-wave signal transmitted to the input terminals 22V and 22H to four signals, respectively. Either one of the four split vertically and horizontally polarized-wave signals is transmitted via four output terminals 24a to 24d (see FIG. 1) to a terminal side. The splitter is a four splitting unit. The output terminals 24a to 24d are connected via coaxial cables for transmitting the received signal to CS tuners 12 disposed in respective rooms of a facility in which the common receiving system is installed, respectively.

[0033]

Also, the CS tuners 12 are connected to television image receivers (hereinafter, referred to just as televisions) 14. By transmitting to the televisions 14 images and sound signals which are received and demodulated by the CS tuners 12, the images and sounds of a desired channel transmitted from the communication satellite can be reproduced on the televisions. Further, in each of the rooms where the CS tuners 12 are disposed, a cable terminal connected to the splitter 10 is embedded in a wall, and usually connected via another cable with each of the CS tuners 12. This respect is omitted from FIG. 2, because the figure only schematically shows the constitution of the common receiving system.

[0034]

Also, among the pair of converter circuits constituting the receiving portion 6 of the receiving antenna 12, the converter circuit for receiving the vertically polarized wave which has an output terminal connected to the input terminal 22V of the splitter 10 is operated by transmitting to the output terminal the polarized-wave switching signal of direct current 11V, while the converter circuit for receiving the horizontally polarized wave which has an output terminal connected to the input terminal 22H of the splitter 10 is operated by transmitting to the output terminal the polarized-wave switching signal of direct current 15V. By transmitting the polarized-wave switching signal of direct current 11V or 15V via an input terminal of the received signal connected to each of the output terminals 24a to 24d of the splitter 10, the CS tuner 12 disposed in each room can switch the polarized wave of the received signal and simultaneously supply power to the receiving antenna 2. Additionally, the constitution of the receiving antenna 2 and the CS tuners 12 is known, whose detailed description is omitted.

[0035]

A constitution of the splitter 10 according to the embodiment, which is a main part of the invention, is now described with reference to FIG. 1.

Figure 1:
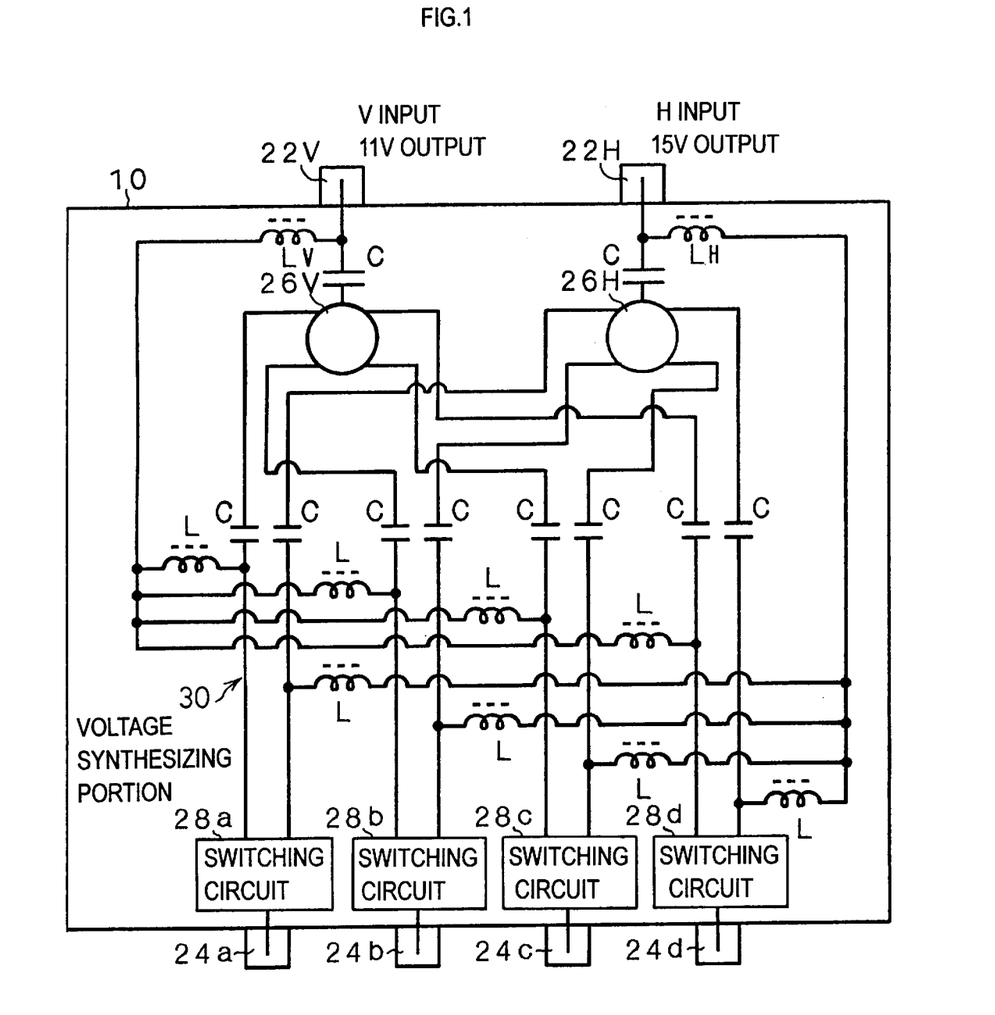
[FIG. 1] It is a schematic diagram showing a constitution of a splitter according to an embodiment.

In the splitter 10 shown in FIG. 1, in the input terminals 22V and 22H for the input of the vertically and horizontally polarized-wave signals (for V input and for H input), their terminal centers connected to cores of the coaxial cables are connected via capacitors C for cutting direct currents and passing high-frequency components to a pair of splitting circuits 26V and 26H, respectively. The splitting circuits 26V and 26H split the vertically and horizontally polarized-wave signals transmitted to the input terminals 22V and 22H into four signals, respectively. Four output terminals of each splitting circuit are connected to switching circuits 28a to 28d via a voltage synthesizing portion 30 constituted of capacitors C and choke coils L, respectively.

[0036]

The switching circuits 28a to 28d receive the vertically and horizontally polarized-wave signals split by the splitting circuits 26V and 26H and select either signal. By transmitting the selected vertically or horizontally polarized-wave signal to the corresponding output terminals 24a to 24d, the vertically polarized-wave signal or the horizontally polarized-wave signal is transmitted to the CS tuners connected to the output terminals 24a to 24d. The constitution of the switching circuit is shown in FIG. 3.

[0037]

Figure 3:
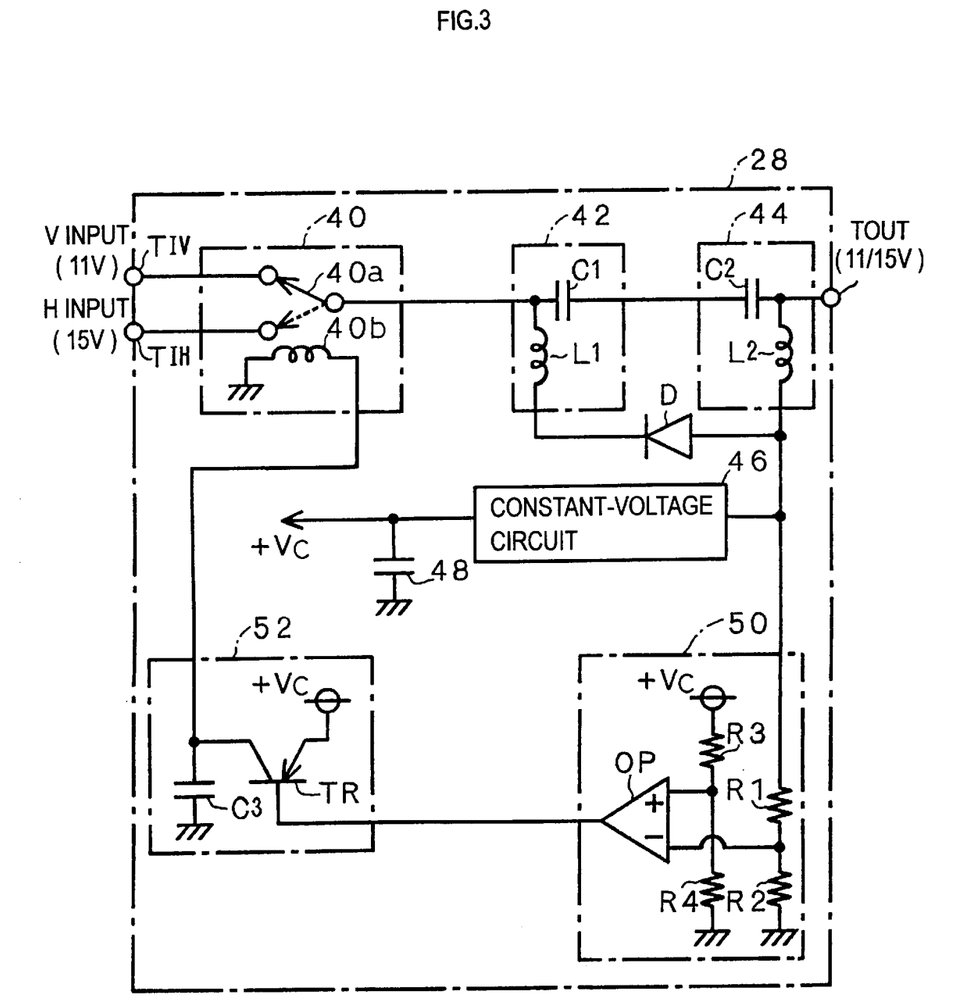
[FIG. 3] It is an electric circuit diagram showing a constitution of a switching circuit according to an embodiment.

Specifically, as shown in FIG. 3, each of the switching circuits 28a to 28d is, as denoted by numeral 28, provided with an vertically polarized-wave signal input terminal TIV for receiving the vertically polarized-wave signal from the switching circuit 26V, an horizontally polarized-wave signal input terminal TIH for receiving the horizontally polarized-wave signal from the splitting circuit 26H, an output terminal Tout for transmitting to the terminal side the received signal (the vertically polarized-wave signal or the horizontally polarized-wave signal) transmitted to either one of the input terminals TIV and TIH, and a relay circuit (corresponding to the switch of the invention) 40 for selectively connecting either one of the input terminals TIV and TIH to the output terminal Tout.

[0038]

Additionally, a signal path between the relay circuit 40 and the output terminal Tout is provided with a power separating filter 44 for separating the polarized-wave switching signal (11V or 15V) transmitted to the output terminal Tout and a power superimposing filter 42 for allowing the polarized-wave switching signal separated by the power separating filter 44 to bypass the relay circuit 40 via a diode D for avoiding a reverse direction flow.

[0039]

Further, the relay circuit 40 is constituted in a known manner of a relay contact 40*a* and a relay coil 40*b*. In the embodiment, when no electricity is conducted to the relay coil 40*b*, the relay contact 40*a* connects the input terminal TIV to the output terminal Tout, thereby transmitting the vertically polarized-wave signal via the output terminal Tout. When electricity is conducted to the relay coil 40*b*, the relay contact 40*a* connects the input terminal TIH to the output terminal Tout, thereby transmitting the horizontally polarized-wave signal via the output terminal Tout.

[0040]

Also, the power superimposing filter 42 is constituted of a coil L1 which superimposes a direct-current voltage (i.e., the polarized-wave switching signal) transmitted via the diode D to the signal path between the relay circuit 40 and the power separating filter 44 and a capacitor C1 which prevents a direct current from flowing to the output terminal Tout by means of the direct-current voltage superimposed via the coil L1, to form a bypass filter for passing the high-frequency component in the signal path of the received signal. Also, the power separating filter 44 is constituted of a coil L2 which takes the direct-current voltage transmitted to the output terminal Tout from the terminal side and a capacitor C2 which prevents a direct current from passing the signal path between the power superimposing filter 42 and the output terminal Tout and flowing from the output terminal Tout to the relay circuit 40, to form a bypass filter for passing the high-frequency component in the signal path of the received signal.

[0041]

Additionally, each of the switching circuits 28*a* to 28*d* is provided with a constant-voltage circuit 46 for converting the direct-current voltage (polarized-wave switching signal) separated by the power separating filter 44 into a constant voltage and a smoothing capacitor 48 for stabilizing an output from the constant-voltage circuit. By operating these, a constant power voltage +Vc is generated. Also, each of the switching circuits 28*a* to 28*d* is provided with a determination circuit 50 for operating in response to the generated power voltage +Vc and a drive circuit 52 for switching on or off the relay coil 40*b*.

[0042]

The determination circuit 50 determines whether the voltage level of the polarized-wave switching signal from the terminal side separated by the power separating filter 44 is the voltage level of 11V for receiving the vertically polarized wave or 15V for receiving the horizontally polarized wave. The determination circuit is constituted of a comparator provided with partial-pressure resistors R1 and R2 for dividing the polarized-wave switching signal, resistors R3 and R4 for generating a reference voltage for determining the voltage by dividing the power voltage +Vc and an operating amplifier OP which compares the voltage value of the polarized-wave switching signal divided by the resistors R1 and R2 with the reference voltage prepared by the resistors R3 and R3 and emits a high-level determination signal when the polarized-wave switching signal transmitted from the terminal side is, for example, 13V or more or emits a low-level determination signal when the polarized-wave switching signal is less than 13V.

[0043]

Also, the drive circuit 52 is constituted of a PNP transistor TR for receiving the power voltage +Vc on its emitter and the determination signal from the determination circuit 50 on its base, respectively, and turning on when the determination signal is of a low level to flow a current via its collector to the relay coil 40*b*, and a capacitor C3 for absorbing a change in voltage connected to the collector of the transistor TR.

[0044]

As a result, the CS tuners 12 emit the polarized-wave switching signal of direct current 11V. When the signal is transmitted via the output terminals 24*a* to 24*d* to the switching circuits 28*a* to 28*d*, in the switching circuits 28*a* to 28*d* an output of the determination circuit 50 becomes high, the transistor TR in the drive circuit 52 turns off, the electricity through the relay coil 40*b* is shut off and the relay contact 40*a* is switched to the input terminal TIV for receiving the vertically polarized-wave signal. Conversely, when the polarized-wave switching signal of direct current 15V from the CS tuners 12 is transmitted via the output terminals 24*a* to 24*d* to the switching circuits 28*a* to 28*d*, in the switching circuits 28*a* to 28*d* the output of the determination circuit 50 becomes low, the transistor TR in the drive circuit 52 turns on, electricity is conducted to the relay coil 40*b* and the relay contact 40*a* is switched to the input terminal TIH for receiving the horizontally polarized-wave signal. Therefore, the vertically polarized-wave signal or the horizontally polarized-wave signal is transmitted to the CS tuners 12 connected to the output terminals 24*a* to 24*d* in accordance with the voltage level of the polarized-wave switching signal emitted by the CS tuners 12.

[0045]

Also, in each of the switching circuits 28*a* to 28*d*, the polarized-wave switching signal transmitted to the output terminal Tout is applied to the side of the power superimposing filter 42 of the relay circuit 40 via the polarized-wave switching signal output circuit constituted of the coil L2 in the power separating filter 44, the diode D for avoiding a reverse direction flow and the coil L1 in the power superimposing filter 42. As a result, among the four switching circuits 28*a* to 28*d*, the switching circuit which selects the vertically polarized-wave signal in accordance with the polarized-wave switching signal of 11V emitted from the CS tuner 12 transmits the polarized-wave switching signal of 11V via the relay circuit 40 and the input terminal TIV to the splitting output terminal of the splitting circuit 26V. The switching circuit which selects the horizontally polarized-wave signal in accordance with the polarized-wave switching signal of 15V emitted from the CS tuner 12 transmits the polarized-wave switching signal of 15V via the relay circuit 40 and the input terminal TIH to the splitting output terminal of the splitting circuit 26H.

[0046]

Subsequently, the voltage synthesizing portion 30 provided in the input path of the received signal extending from the splitting output terminals of the splitting circuits 26V and 26H to the input terminals TIV and TIH of the switching circuits 28*a* to 28*d* is, as shown in FIG. 1, constituted of eight choke coils L for taking the polarized-wave switching signals of 11V and 15V emitted from the input terminals TIV and TIH of the switching circuits 28*a* to 28*d*, and eight capacitors C for preventing a current from flowing to the splitting circuits 26V and 26H in accordance with the polarized-wave switching signals.

[0047]

Among the aforementioned eight choke coils L, other ends of the choke coils L connected to the input terminals TIV of the switching circuits 28*a* to 28*d* are interconnected with one another, and connected via a choke coil LV as a synthesized voltage applying circuit to the input terminal 22V for receiving the vertically polarized-wave signal (V input). Other ends of the choke coils L connected to the input terminals TIH of the switching circuits 28*a* to 28*d* are interconnected with one another, and connected via a choke coil LH as a synthesized voltage applying circuit to the input terminal 22H for receiving the horizontally polarized-wave signal (H input).

[0048]

Therefore, the polarized-wave switching signals of 11V and 15V emitted from the input terminals TIV and TIH of the switching circuits 28*a* to 28*d* are transmitted to the converter circuit for receiving the vertically polarized-wave signal and the converter circuit for receiving the horizontally polarized-wave signal built in the receiving portion 6 of the receiving antenna 2, respectively. The converter circuits receive the polarized-wave switching signals (11V, 15V) necessary for the operation to normally operate, and emit the vertically polarized-wave signal and the horizontally polarized-wave signal, respectively.

[0049]

As aforementioned, the splitter 10 in the embodiment does not simply receive the vertically and horizontally polarized-wave signals from the receiving antenna 2 so as to split each of the received signals into four. Among the four split vertically or horizontally polarized-wave signals, the signal (the vertically polarized-wave signal or the horizontally polarized-wave signal) is selected in accordance with the polarized-wave switching signal transmitted from the CS tuners 12 to the output terminals 24*a* to 24*d*, and emitted from the output terminals 24*a* to 24*d*. Therefore, the received signal of the polarized wave desired by the CS tuners 12 can be transmitted to the CS tuners 12 connected to the output terminals 24*a* to 24*d*, respectively. On the side of each CS tuner 12, the broadcasting of a desired polarized-wave channel can be enjoyed individually.

[0050]

Also in the splitter 10 of the embodiment, although either the vertically polarized-wave signal or the horizontally polarized-wave signal can be transmitted to the CS tuners 12 or other terminal units in accordance with the polarized-wave switching signal, the transmission path of the received signal extended from the splitter 10 to the terminal units can be realized with one cable (coaxial cable). As compared with the prior art, the wiring work of the cable for transmitting the received signals can be facilitated. As a result, different from the prior art, the input path of the received signals to the CS tuners 12 or other terminal units does not require a separate switching unit for switching between the vertically polarized wave and the horizontally polarized wave. Further, only one input terminal of the received signal can be provided in each room where the CS tuner 12 or another terminal unit is installed. Consequently, the installation work of the terminal unit in each room is facilitated, while the number of components to be installed in each room can be decreased.

[0051]

Further in the splitter 10 of the embodiment, each of the switching circuits 28*a* to 28*d* is provided with the coil L2, the diode D and the coil L1 as polarized-wave switching signal output circuits. Further, the voltage synthesizing portion 30 constituted of eight choke coils L and eight capacitors C is provided for synthesizing the polarized-wave switching signals emitted from the input terminals TIV and TIH of each of the switching circuits 28*a* to 28*d*. Additionally, the choke coils LV and LH are provided as the synthesized voltage applying circuits for applying to the input terminals 22V and 22H of the splitter 10 the polarized-wave switching signals synthesized by the voltage synthesizing portion 30 for receiving the vertically and horizontally polarized-wave signals, respectively. These portions constitute a direct-current bypass circuit (claim 2). As a result, as aforementioned, by synthesizing the polarized-wave switching signals for receiving the polarized waves transmitted from the CS tuners 12 or other terminal units to the output terminals 24*a* to 24*d*, the polarized-wave switching signal of 11V is supplied to the converter circuit for receiving the vertically polarized-wave signal on the side of the receiving antenna 2, while the polarized-wave switching signal of 15V can be supplied to the converter circuit for receiving the horizontally polarized wave on the side of the receiving antenna 2. The converter circuits on the side of the receiving antenna 2 can be normally operated.

[0052]

The embodiment of the invention has been described above, but the invention is not limited to the aforementioned embodiment and can be embodied in various manners.

Figure 4:
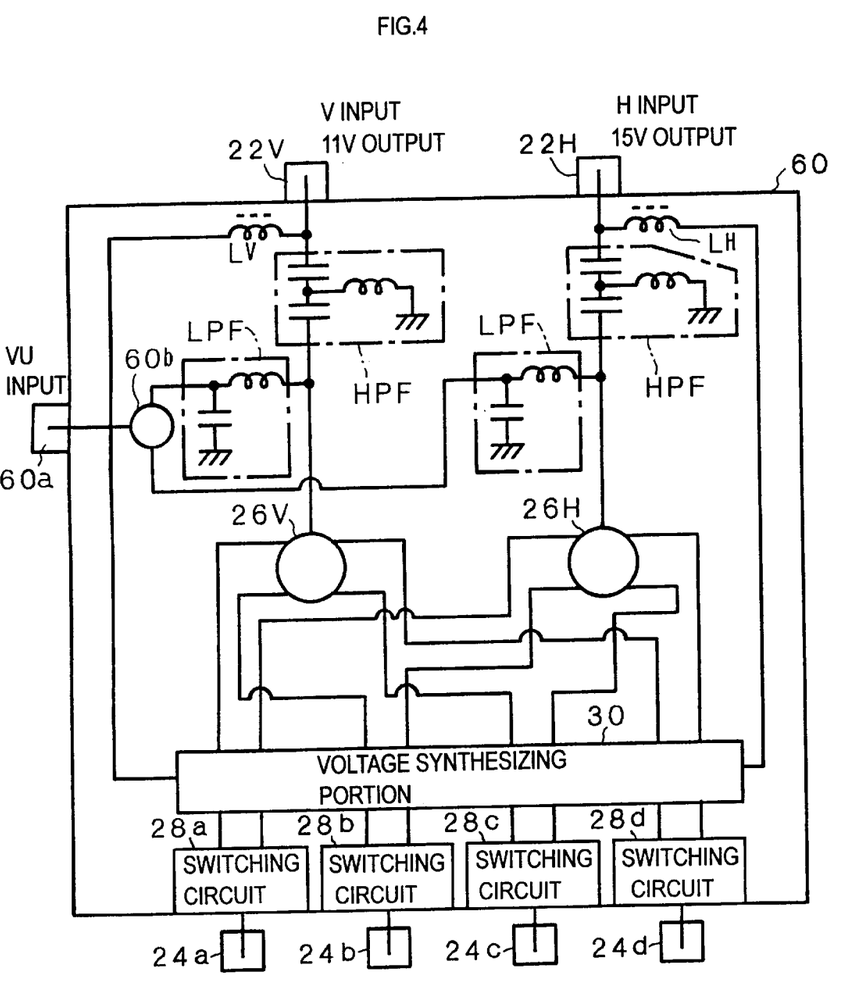
[FIG. 4] It is a schematic diagram showing a constitution of a splitter provided with a VU input terminal.

For example, in the aforementioned embodiment, the splitter for splitting the satellite signal into four has been described, in which the received signals of the vertically and horizontally polarized waves emitted from the receiving antenna (satellite receiving antenna) 2 are received, and the received signals of the polarized waves are transmitted to the CS tuners 12 or other terminal units connected to the output terminals 24*a* to 24*d*, respectively, in accordance with the polarized-wave switching signals received from the terminal units. For example, as shown in FIG. 4, the splitter 10 of the aforementioned embodiment can further be provided with a VU input terminal 60*a* as a second input terminal for receiving received signals of VHF and UHF television broadcasting signals (the second received signal recited in claim 4; hereinafter, referred to as the VU signal); a VU splitting circuit 60*b* as a second splitting circuit for splitting the VU signal transmitted to the VU input terminal 60*a* into two; and low pass filters LPF and high pass filters HPF as a second received signal superimposing circuit for superimposing the two VU signals split by the VU splitting circuit 60*b* via the input terminals 22V and 22H to received-signal input paths to the splitting circuits 26V and 26H and transmitting the VU signal together with the vertically and horizontally polarized-wave signals to the splitting circuits 26V and 26H, respectively. Then, a splitter 60 can be constituted for receiving both the satellite signal and the VU signal.

[0053]

Figure 5:
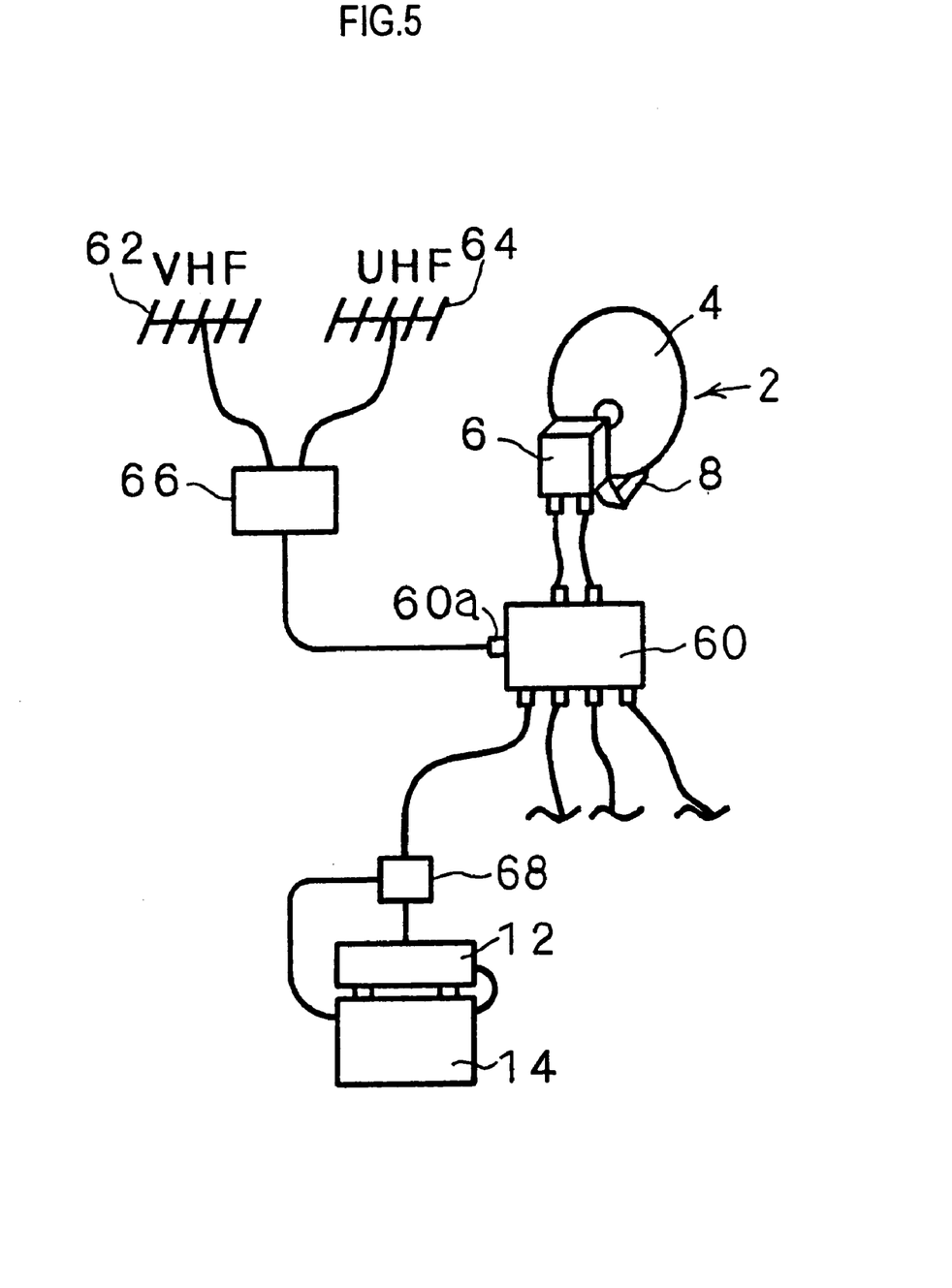
[FIG. 5] It is a schematic diagram showing a constitution of a common receiving system which uses the splitter of FIG. 4.

According to the splitter 60 having the aforementioned constitution, for example, as shown in FIG. 5, a common receiving system can be easily realized. Specifically, in the common receiving system of FIG. 5, received signals formed by mixing a received signal (VHF signal) from a VHF receiving antenna 62, a received signal (UHF signal) from a UHF receiving antenna 64 and the received signal from the communication-satellite receiving antenna 2 can be transmitted via one coaxial cable to the terminal units. In constructing such system, as shown in the figure, the VHF and UHF signals are mixed and amplified by an amplifier 66 and the mixed/amplified VU signal is transmitted to the VU input terminal 60*a* of the splitter 60, while the received signals (the vertically and horizontally polarized-wave signals) from the receiving antenna 2 are, in the same manner as in the aforementioned embodiment, transmitted to the input terminals 22V and 22H of the splitter 60 (see FIG. 4). The output terminals 24*a* to 24*d* of the splitter 60

(see FIG. 4) are connected to the terminal units. Thereby, to the terminal units connected to the output terminals 24*a* to 24*d*, a VU signal and a vertically or horizontally polarized-wave satellite received signal (CS signal) in accordance with the polarized-wave switching signal emitted from the terminal units can be transmitted. Therefore, the system can be more simply constructed.

[0054]

Further in the common receiving system shown in FIG. 5, a VU/CS separator 68 is provided on the terminal side for splitting the mixed signal of the VU and CS signals transmitted via one coaxial cable from the splitter 60 into the respective signals. By transmitting the CS signal to the CS tuner 12 and the VU signal to the television 14, respectively, the VHF or UHF television broadcasting is demodulated by a tuner built in the television 14 and the CS signal is demodulated by the CS tuner.

[0055]

Further in the common receiving system shown in FIG. 5, a VU·BS signal formed by mixing a VU signal and a satellite broadcasting signal (BS signal) can be applied to the input terminal 60*a*. In this case, in the splitter 60 shown in FIG. 4, filters which pass even a BS signal band are used as the low pass filters LPF. Instead of the VU/CS separator 68, a VU·BS/CS separator may be used. Also the output frequency of the received signal in the receiving portion 6 may be shifted higher, in such a manner the BS signal band is not overlapped. As the television 14, a television with a BS tuner built therein may be used.

[0056]

Figure 6:
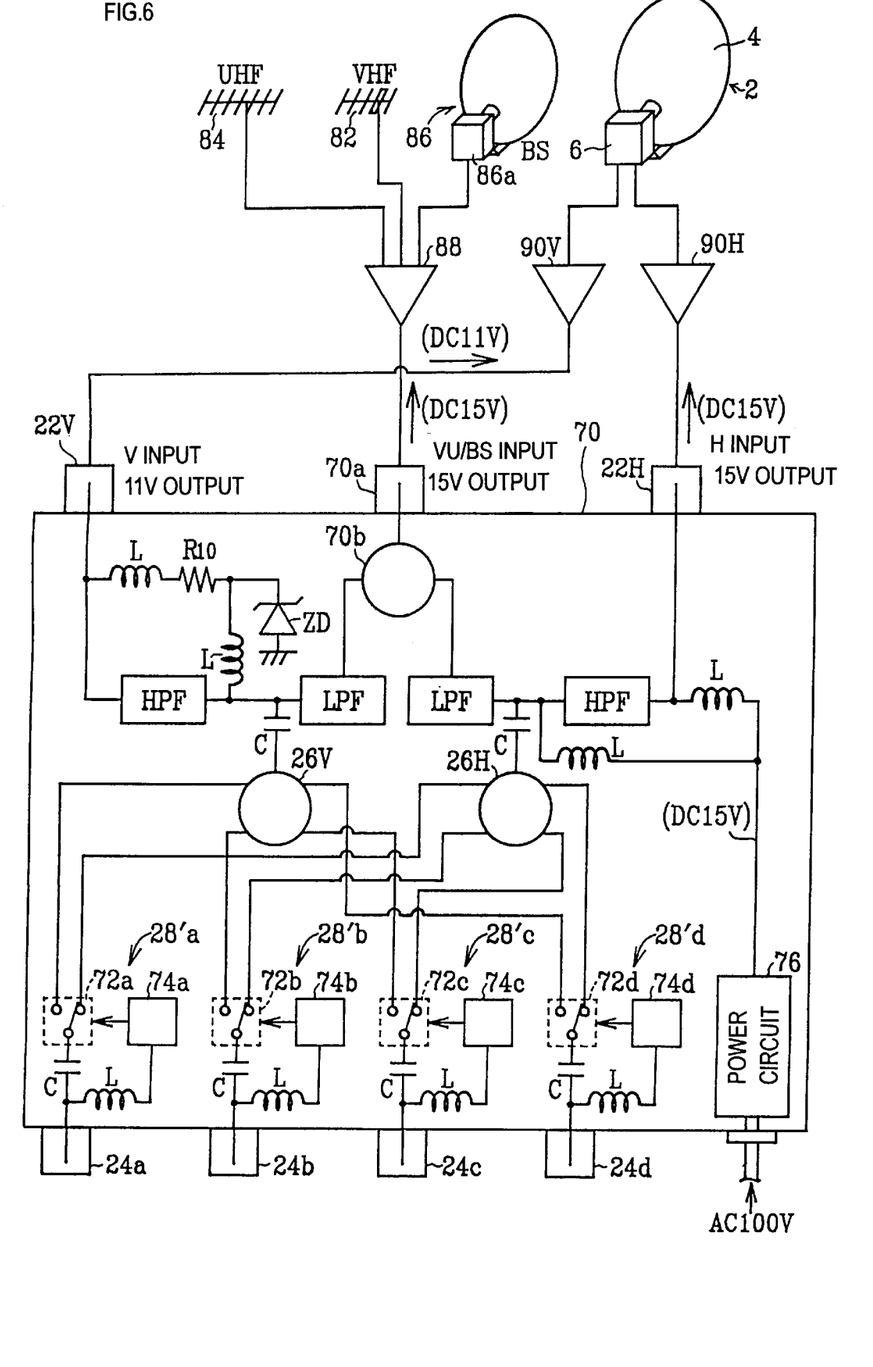
[FIG. 6] It is an explanatory view showing a splitter with a power circuit built therein and a connection condition of an antenna to the splitter.

In the aforementioned embodiment, by allowing the polarized-wave switching signals of 11V and 15V applied from the terminal side to the output terminals 24*a* to 24*d* to bypass the input terminals 22V and 22H, power is supplied to the converter circuits constituting the received portion 6 from the input terminals 22V and 22H in the splitter. On the other hand, for example, a splitter 70 shown in FIG. 6 is provided with a power circuit 76 which takes in a commercial power (AV100V) via an AC cord, and rectifies and smoothes the power to generate a predetermined direct-current voltage (for example, 15V). By the direct-current voltage generated by the power circuit 76, power may be supplied from the input terminals 22V and 22H to the converter circuits constituting the receiving portion 6.

[0057]

In the splitter 70 shown in FIG. 6, instead of the VU input terminal 60*a* of the splitter 60 shown in FIG. 4, a VU·BS input terminal 70*a* is provided. The VU·BS input terminal 70*a* can receive an output signal (VU·BS signal) from an VU·BS amplifier 88 which amplifies, mixes and outputs received signals from VHF, UHF and BS receiving antennas 82, 84 and 86. Subsequently, in the splitter 70 the input VU·BS signal is split into two by a VU·BS splitting circuit 70*b* as the second splitting circuit. The two split VU·BS signals are superimposed via the low pass filters LPF to the vertically and horizontally polarized-wave signals transmitted from the input terminals 22V and 22H via the high pass filters HPF, respectively, and transmitted via the capacitors C to the splitting circuits 26V and 26H.

On the other hand, the direct-current voltage (15V) generated by the power circuit 76 is transmitted via the choke coil L to the input terminal 22H, and simultaneously transmitted via another choke coil L to connection point of the low pass filter LPF and the high pass filter HPF connected via the capacitor C on the input side of the splitting circuit 26H. As a result, the direct-current voltage (15V) is transmitted from the input terminal 22H toward the receiving portion 6 of the receiving antenna 2, and simultaneously transmitted via the low pass filters LPF, the VU·BS splitting circuit 70*b* and VU·BS input terminal 70*a* toward the VU·BS amplifier 88.

[0058]

Therefore, to the converter circuit for receiving the horizontally polarized wave which constitutes the receiving portion 6 of the receiving antenna 2, the direct-current voltage (15V) necessary for its operation can be supplied, while to the VU·BS amplifier 88 the direct-current voltage (15V) necessary for its operation can be supplied. Further via the VU·BS amplifier 88 to a receiving portion (converter circuit) 86*a* of the BS receiving antenna 86, the direct-current voltage (15V) necessary for its operation can be supplied. Also, as shown in the figure, when an amplifier 90H for amplifying the horizontally polarized-wave signal is provided in a path leading from the receiving portion 6 of the receiving antenna 2 to the input terminal 22H, power is supplied to the amplifier 90H, while the power can be supplied via the amplifier 90H to the converter circuit for receiving the horizontally polarized wave in the receiving portion 6.

[0059]

Also to the connection point of the low pass filter LPF and the high pass filter HPF connected via the capacitor C to the input side of the splitting circuit 26V for the vertically polarized-wave signal, a cathode of a Zener diode ZD (breakdown voltage of 11V) with its anode grounded is connected via the choke coil L. Also, the cathode of the Zener diode ZD is connected via a resistor R10 and another choke coil L to the input terminal 22V for the vertically polarized-wave signal. As a result, the direct-current voltage (15V) applied from the power circuit 76 via the choke coil L and the low pass filter LPF to the VU·BS splitting circuit 70*b* is further applied via the low pass filter LPF and the choke coil L to the Zener diode ZD, and converted by the Zener diode ZD to direct-current 11V.

[0060]

Subsequently, the direct-current voltage (11V) is applied via the resistor R10 and the choke coil L to the input terminal 22V, and transmitted from the input terminal 22V to the receiving portion 6 of the receiving antenna 2. Therefore, to the converter circuit for receiving the vertically polarized wave which constitutes the receiving portion 6 of the receiving antenna 2, the direct-current voltage (11V) necessary for its operation can be supplied. Also, as shown in the figure, when an amplifier 90V for amplifying the vertically polarized-wave signal is provided in a path leading from the receiving portion 6 of the receiving antenna 2 to the input terminal 22V, power is supplied to the amplifier 90V, while the power can be supplied via the amplifier 90V to the converter circuit for receiving the vertically polarized wave in the receiving portion 6.

[0061]

In the splitter 70 shown in FIG. 6, the polarized-wave switching signal transmitted from the terminal side to the output terminals 24*a* to 24*d* does not need to be transmitted toward the receiving antenna 2. Therefore, switching circuits 28*a'* to 28*d'* connected to the output terminals 24*a* to 24*d* are constituted simply to select the vertically polarized-wave signal or the horizontally polarized-wave signal in accordance with the polarized-wave switching signal.

[0062]

Specifically, the switching circuits 28*a'* to 28*d'* are constituted, respectively, of switches 72*a* to 72*d* which select one of the vertically polarized-wave signal and the horizontally polarized-wave signal transmitted from the splitting circuits 26V and 26H and transmit the selected signal via the capacitor C to the corresponding output terminals 24a to 24d, and determination/drive circuits 74a to 74d which take in via the choke coils L the polarized-wave switching signal transmitted to the output terminals 24a to 24d from the terminal side, determine from a voltage level of the taken polarized-wave switching signal which one of the vertically polarized-wave signal and the horizontally polarized-wave signal is to be selected and which drive the switches 72a to 72d according to a determination result.

[0063]

As a result, also in the splitter 70 shown in FIG. 6, in the same manner as the splitters 10 and 60 shown in FIGS. 1 and 4, the received signal of a polarized-wave face desired by the terminal units can be transmitted to the CS tuners or other terminal units connected to the output terminals 24a to 24d.

[0064]

In the aforementioned embodiment, the quarter splitter for splitting the received signal from the receiving antenna 2 into four to be emitted has been described. It goes without saying that by appropriately setting the splitting number of the pair of splitting circuits 26V and 26H provided therein, the splitter having an optional splitting number can be constituted.

DESCRIPTION OF CODES 10, 60, 70 . . . splitter 22V, 22H . . . input terminal
24a to 24d . . . output terminal 26V, 26H . . . splitting circuit
28a to 28d . . . switching circuit
30 . . . voltage synthesizing portion C . . . capacitor
L, LV, LH . . . choke coil 40 . . . relay circuit
42 . . . power superimposing filter 44 . . . power separating filter
46 . . . constant-voltage circuit
48 . . . smoothing capacitor 50 . . . determination circuit
52 . . . drive circuit
60a . . . VU input terminal 60b . . . VU splitting circuit
70a . . . VU·BS input terminal 70b . . . VU·BS splitting circuit
72a to 72d . . . relay switch
74a to 74d . . . determination/drive circuit

I claim:

1. A satellite signal splitter which is connected to a satellite receiving antenna provided with a receiving portion for receiving an electric wave of two orthogonal polarized waves transmitted from a communication satellite by splitting the electric wave into a vertically polarized wave and a horizontally polarized wave, converting the polarized-wave signals to received signals having a predetermined frequency band and emitting the converted signals, splitting the received signals from the receiving portion into a plurality of signals and transmitting the split signals to a terminal side, the satellite signal splitter comprising:

a pair of first input terminals for respectively receiving a vertically polarized-wave signal and a horizontally polarized-wave signal from a receiving portion of a satellite receiving antenna;

a pair of first splitting circuits for respectively splitting the polarized-wave signals transmitted to the pair of first input terminals into a plurality of signals;

a plurality of switching circuits corresponding to a number of signals split by the pair of first splitting circuits for receiving the vertically polarized-wave signal and the horizontally polarized-wave signal split by the first splitting circuits and selecting either one of the signals to be emitted;

a plurality of output terminals corresponding to the number of split signals for respectively transmitting the vertically polarized-wave signal and the horizontally polarized-wave signal transmitted from the switching circuits to a terminal side;

the switching circuits selecting one of the vertically polarized-wave signal and the horizontally polarized-wave signal, in accordance with a polarized-wave switching signal transmitted to the output terminal connected thereto from the terminal side, and emitting the selected signal from the output terminal;

a determination circuit for determining which one of the vertically polarized-wave signal and the horizontally polarized-wave signal is to be emitted in accordance with a voltage level of the polarized-wave switching signal transmitted to the output terminals from the terminal side;

a drive circuit for driving a switch in accordance with a result of a determination made by the determination circuit to transmit one of the vertically polarized-wave signal and the horizontally polarized-wave signal to the output terminals; and a direct-current signal bypass circuit being provided for using the polarized-wave switching signal transmitted to the output terminals from the terminal side as a power supply signal to the receiving portion of the satellite receiving antenna to bypass the first input terminals.

2. The satellite signal splitter according to claim 1, wherein the direct-current signal bypass circuit comprises:

a plurality of polarized-wave switching signal output circuits disposed in the plurality of switching circuits for transmitting the polarized-wave switching signal via the switch to an input path of the vertically polarized-wave signal or the horizontally polarized-wave signal;

a voltage synthesizing portion for respectively synthesizing the polarized-wave switching signal transmitted via the polarized-wave switching signal output circuits and the switch to the input path of the vertically polarized-wave signal of the switching signal circuits and for synthesizing the polarized-wave switching signal transmitted via the polarized-wave switching signal output circuits and the switch to the input path of the horizontally polarized-wave signal of the switching signal circuits; and a synthesized voltage applying circuit for applying, to the first input terminal of the vertically polarized-wave signal, a synthesized voltage of the polarized-wave switching signal transmitted to the input path of the vertically polarized-wave signal and synthesized by the voltage synthesizing portion and for applying to the first input terminal of the horizontally polarized-wave signal a synthesized voltage of the polarized-wave switching signal transmitted to the input path of the horizontally polarized-wave signal and synthesized by the voltage synthesizing portion.

3. The satellite signal splitter according to claim 1, wherein the satellite signal splitter further comprises a power circuit provided for transmitting from the first pair of input terminals to the receiving portion a direct-current voltage which is obtained by rectifying and smoothing a commercial power thereby supplying power to the receiving portion.

4. The satellite signal splitter according to claim 1, wherein the satellite signal splitter further comprises:

- a second input terminal, in addition to the pair of first input terminals, for receiving a second received signal from a second receiving antenna other than the satellite receiving antenna;
- a second splitting circuit, in addition to the pair of first splitting circuits, for splitting into two the received signal transmitted to the second input terminal; and
- a second received signal superimposing circuit for superimposing the second received signal split into two by the second splitting circuit to received signal input paths of the pair of first splitting circuits and respectively transmitting to the pair of splitting circuits the second received signals together with the vertically polarized-wave signal and the horizontally polarized-wave signal.

5. The satellite signal splitter according to claim 4, wherein the alternative received signal is a ground wave signal.

6. A satellite signal splitter which is connected to a satellite receiving antenna provided with a receiving portion for receiving an electric wave of two orthogonal polarized waves transmitted from a communication satellite by splitting the electric wave into a vertically polarized wave and a horizontally polarized wave, converting the polarized-wave signals to received signals having a predetermined frequency band and emitting the converted signals, splitting the received signals from the receiving portion into a plurality of signals and transmitting the split signals to a terminal side, the satellite signal splitter comprising:

- a pair of first input terminals for respectively receiving a vertically polarized-wave signal and a horizontally polarized-wave signal from a receiving portion of a satellite receiving antenna;
- a pair of first splitting circuits for respectively splitting the polarized-wave signals transmitted to the pair of first input terminals into a plurality of signals;
- a plurality of switching circuits corresponding to a number of signals split by the pair of first splitting circuits for receiving the vertically polarized-wave signal and the horizontally polarized-wave signal split by the first splitting circuits and selecting either one of the signals to be emitted;
- a plurality of output terminals corresponding to the number of split signals for respectively transmitting the vertically polarized-wave signal and the horizontally polarized-wave signal transmitted from the switching circuits to a terminal side;
- the switching circuits selecting one of the vertically polarized-wave signal and the horizontally polarized-wave signal, in accordance with a polarized-wave switching signal transmitted to the output terminal connected thereto from the terminal side, and emitting the selected signal from the output terminal;
- a determination circuit for determining which one of the vertically polarized-wave signal and the horizontally polarized-wave signal is to be emitted in accordance with a voltage level of the polarized-wave switching signal transmitted to the output terminals from the terminal side;
- a drive circuit for driving a switch in accordance with a result of a determination made by the determination circuit to transmit one of the vertically polarized-wave signal and the horizontally polarized-wave signal to the output terminals;
- a direct-current signal bypass circuit being provided for using the polarized-wave switching signal transmitted to the output terminals from the terminal side as a power supply signal to the receiving portion of the satellite receiving antenna to bypass the first input terminals;
- a plurality of polarized-wave switching signal output circuits disposed in the plurality of switching circuits for transmitting the polarized-wave switching signal via the switch to an input path of the vertically polarized-wave signal or the horizontally polarized-wave signal;
- a voltage synthesizing portion for respectively synthesizing the polarized-wave switching signal transmitted via the polarized-wave switching signal output circuits and the switch to the input path of the vertically polarized-wave signal of the switching signal circuits and for synthesizing the polarized-wave switching signal transmitted via the polarized-wave switching signal output circuits and the switch to the input path of the horizontally polarized-wave signal of the switching signal circuits; and
- a synthesized voltage applying circuit, for applying to the first input terminal of the vertically polarized-wave signal, a synthesized voltage of the polarized-wave switching signal transmitted to the input path of the vertically polarized-wave signal and synthesized by the voltage synthesizing portion and for applying to the first input terminal of the horizontally polarized-wave signal a synthesized voltage of the polarized-wave switching signal transmitted to the input path of the horizontally polarized-wave signal and synthesized by the voltage synthesizing portion.

7. The satellite signal splitter according to claim 6, wherein the satellite signal splitter further comprises a power circuit is provided for transmitting from the first pair of input terminals to the receiving portion a direct-current voltage which is obtained by rectifying and smoothing a commercial power thereby supplying a power to the receiving portion.

8. The satellite signal splitter according to claim 6, wherein the satellite signal splitter further comprises:

- a second input terminal, in addition to the pair of first input terminals, for receiving a second received signal from a second receiving antenna other than the satellite receiving antenna;
- a second splitting circuit, in addition to the pair of first splitting circuits, for splitting into two the received signal transmitted to the second input terminal; and
- a second received signal superimposing circuit for superimposing the second received signals split into two by the second splitting circuit to received signal input paths of the pair of first splitting circuits and respectively transmitting to the pair of splitting circuits the second received signals together with the vertically polarized-wave signal and the horizontally polarized-wave signal.

9. The satellite signal splitter according to claim 6 wherein the alternative received signal is a ground wave signal.

* * * * *